United States Patent
Yan et al.

(10) Patent No.: US 9,778,817 B2
(45) Date of Patent: Oct. 3, 2017

(54) TAGGING OF IMAGES BASED ON SOCIAL NETWORK TAGS OR COMMENTS

(71) Applicant: Findo, Inc., Wilmington, DE (US)

(72) Inventors: David Yan, Portola Valley, CA (US); Konstantin Anisimovich, Moscow (RU)

(73) Assignee: FINDO, INC., Wilmington, DE (US)

( * ) Notice: Subject to any disclaimer, the term of this patent is extended or adjusted under 35 U.S.C. 154(b) by 250 days.

(21) Appl. No.: 14/311,952

(22) Filed: Jun. 23, 2014

(65) Prior Publication Data
US 2015/0186420 A1 Jul. 2, 2015

Related U.S. Application Data

(60) Provisional application No. 61/922,597, filed on Dec. 31, 2013.

(51) Int. Cl.
*G06F 17/30* (2006.01)
*G06F 3/0481* (2013.01)
(Continued)

(52) U.S. Cl.
CPC ...... *G06F 3/04817* (2013.01); *G06F 3/04842* (2013.01); *G06F 17/211* (2013.01); *G06F 17/22* (2013.01); *G06F 17/301* (2013.01); *G06F 17/30017* (2013.01); *G06F 17/3053* (2013.01); *G06F 17/30112* (2013.01); *G06F 17/30115* (2013.01); *G06F 17/30126* (2013.01); *G06F 17/30253* (2013.01); *G06F 17/30268* (2013.01); *G06F 17/30327* (2013.01);
(Continued)

(58) Field of Classification Search
CPC ............. G06F 3/04817; G06F 3/04842; G06F 17/211; G06F 17/22; G06F 17/30017; G06F 17/301; G06F 17/30112; G06F 17/30115; G06F 17/30253; G06F 17/30327; G06F 17/3053; G06F 17/30544; G06F 17/30598; G06F 17/30867; G06F 17/30997; G06F 17/30268; G10L 15/1815; G06Q 10/107
USPC ................................................. 707/736, 737
See application file for complete search history.

(56) References Cited

U.S. PATENT DOCUMENTS

| 6,101,515 A | 8/2000 | Wical et al. |
| 6,889,209 B1 | 5/2005 | Rabin et al. |

(Continued)

OTHER PUBLICATIONS

Ghosh et al., "C-FaRM: A Collaborative and Context Aware Framework for Requirement Management", IEEE 2011, pp. 29-30.
(Continued)

*Primary Examiner* — Hares Jami
(74) *Attorney, Agent, or Firm* — Lowenstein Sandler LLP

(57) ABSTRACT

Various embodiments are provided for enabling tagging of image files based on tagging or commenting on images on a social networking site. The tagging or commenting on an image on the social networking site is detected by the system. The social network tag or comment is analyzed to determine a textual tag to be assigned to image files corresponding to the social network images that have been tagged or commented on. In some implementations semantic analysis of text component of the social network tags or comments is performed. In some implementations the textual tags are then propagated to other image files associated with the user.

24 Claims, 3 Drawing Sheets

(51) Int. Cl.
  *G06F 17/21* (2006.01)
  *G06F 17/22* (2006.01)
  *G06F 3/0484* (2013.01)
  *G10L 15/18* (2013.01)
  *G06Q 10/10* (2012.01)

(52) U.S. Cl.
  CPC .. *G06F 17/30554* (2013.01); *G06F 17/30598* (2013.01); *G06F 17/30867* (2013.01); *G06F 17/30997* (2013.01); *G10L 15/1815* (2013.01); *G06Q 10/107* (2013.01)

(56) References Cited

U.S. PATENT DOCUMENTS

| | | | |
|---|---|---|---|
| 7,216,304 | B1 | 5/2007 | Gourdol et al. |
| 7,516,218 | B2 | 4/2009 | Besson |
| 8,332,333 | B2 | 12/2012 | Agarwal |
| 8,359,300 | B1 | 1/2013 | Shin |
| 8,566,370 | B2 | 10/2013 | Jin et al. |
| 8,738,611 | B1 | 5/2014 | Zarmer et al. |
| 8,819,425 | B2 | 8/2014 | Rangsikitpho et al. |
| 8,930,825 | B2 | 1/2015 | Brugler et al. |
| 8,938,449 | B1* | 1/2015 | Duerig .............. G06F 17/30265 707/723 |
| 9,002,867 | B1 | 4/2015 | Adams et al. |
| 9,043,413 | B2 | 5/2015 | Kraft et al. |
| 9,195,679 | B1* | 11/2015 | Svendsen .......... G06F 17/30268 |
| 9,304,657 | B2 | 4/2016 | Yan et al. |
| 9,405,771 | B2* | 8/2016 | Balakrishnan .... G06F 17/30256 |
| 2002/0024443 | A1 | 2/2002 | Hawkins et al. |
| 2002/0083439 | A1 | 6/2002 | Eldering |
| 2002/0184317 | A1 | 12/2002 | Thankachan |
| 2004/0133564 | A1 | 7/2004 | Gross et al. |
| 2004/0225658 | A1 | 11/2004 | Horber |
| 2005/0160369 | A1 | 7/2005 | Balabanovic et al. |
| 2005/0187795 | A1 | 8/2005 | Russell |
| 2005/0235012 | A1 | 10/2005 | Harry et al. |
| 2006/0156246 | A1 | 7/2006 | Williams et al. |
| 2006/0235933 | A1 | 10/2006 | Baluja et al. |
| 2007/0016553 | A1 | 1/2007 | Dumais et al. |
| 2007/0088690 | A1 | 4/2007 | Wiggen et al. |
| 2007/0156843 | A1 | 7/2007 | Sagen et al. |
| 2007/0240050 | A1 | 10/2007 | Quinn-Jacobs |
| 2008/0086453 | A1 | 4/2008 | Fabian |
| 2008/0104024 | A1 | 5/2008 | Kumar et al. |
| 2008/0172380 | A1 | 7/2008 | Czyz et al. |
| 2008/0228719 | A1 | 9/2008 | Abhyanker et al. |
| 2008/0313570 | A1* | 12/2008 | Shamma ............ G06F 17/30525 715/846 |
| 2009/0055742 | A1 | 2/2009 | Nordhagen |
| 2009/0103901 | A1 | 4/2009 | Endo et al. |
| 2009/0157948 | A1 | 6/2009 | Trichina et al. |
| 2009/0187537 | A1 | 7/2009 | Yachin et al. |
| 2009/0217352 | A1 | 8/2009 | Shen et al. |
| 2009/0222738 | A1 | 9/2009 | Drieschner |
| 2009/0222755 | A1 | 9/2009 | Drieschner |
| 2009/0228233 | A1 | 9/2009 | Anderson et al. |
| 2010/0064341 | A1 | 3/2010 | Aldera |
| 2010/0107119 | A1 | 4/2010 | Libert et al. |
| 2010/0161503 | A1 | 6/2010 | Foster |
| 2010/0185986 | A1 | 7/2010 | Quintanilla et al. |
| 2010/0235165 | A1* | 9/2010 | Todhunter ............ G06F 17/279 704/9 |
| 2011/0022982 | A1 | 1/2011 | Takaoka et al. |
| 2011/0066658 | A1 | 3/2011 | Rhoads et al. |
| 2011/0119616 | A1 | 5/2011 | Suzuki |
| 2011/0178962 | A1 | 7/2011 | Sood |
| 2011/0196521 | A1 | 8/2011 | Jain et al. |
| 2011/0258188 | A1 | 10/2011 | AbdAlmageed et al. |
| 2011/0289121 | A1 | 11/2011 | Pirkner |
| 2012/0005282 | A1 | 1/2012 | Steinbok et al. |
| 2012/0158686 | A1* | 6/2012 | Hua .................. G06F 17/30268 707/706 |
| 2012/0271790 | A1* | 10/2012 | Lappas ................. G06N 7/005 706/52 |
| 2012/0278512 | A1 | 11/2012 | Alatorre et al. |
| 2013/0005487 | A1 | 1/2013 | Frazzini et al. |
| 2013/0036454 | A1 | 2/2013 | Purvis et al. |
| 2013/0046761 | A1 | 2/2013 | Soderberg et al. |
| 2013/0055099 | A1 | 2/2013 | Yao et al. |
| 2013/0139191 | A1 | 5/2013 | Ren |
| 2013/0159306 | A1* | 6/2013 | Janssen, Jr. ........ G06F 17/30734 707/737 |
| 2013/0179910 | A1 | 7/2013 | Hio |
| 2013/0198361 | A1 | 8/2013 | Matsuzaki et al. |
| 2013/0218912 | A1 | 8/2013 | Howard et al. |
| 2013/0254184 | A1 | 9/2013 | Ellsworth et al. |
| 2013/0254718 | A2 | 9/2013 | Kermoian et al. |
| 2013/0325462 | A1* | 12/2013 | Somekh ............ G06F 17/30265 704/235 |
| 2013/0325769 | A1 | 12/2013 | Downs et al. |
| 2013/0346068 | A1* | 12/2013 | Solem ............... G06F 17/30268 704/9 |
| 2014/0040862 | A1 | 2/2014 | Webster et al. |
| 2014/0325516 | A1 | 10/2014 | Ventroux |
| 2014/0344248 | A1* | 11/2014 | Stoop ............... G06F 17/30268 707/722 |
| 2014/0372467 | A1 | 12/2014 | Locker et al. |
| 2015/0026187 | A1 | 1/2015 | Ballou et al. |
| 2015/0046463 | A1 | 2/2015 | Mohan |
| 2015/0186366 | A1 | 7/2015 | Yan et al. |
| 2015/0186369 | A1 | 7/2015 | Yan et al. |
| 2015/0186381 | A1 | 7/2015 | Yan et al. |
| 2015/0186395 | A1 | 7/2015 | Yan et al. |
| 2015/0186398 | A1 | 7/2015 | Yan et al. |
| 2015/0186478 | A1 | 7/2015 | Yan et al. |
| 2015/0186538 | A1 | 7/2015 | Yan et al. |
| 2015/0187353 | A1 | 7/2015 | Yan et al. |
| 2015/0304447 | A1 | 10/2015 | Karp et al. |
| 2016/0096112 | A1 | 4/2016 | Sharma et al. |
| 2016/0212208 | A1 | 7/2016 | Kulkarni et al. |
| 2016/0226996 | A1 | 8/2016 | Shabtai et al. |
| 2016/0283061 | A1 | 9/2016 | DiPersia et al. |

OTHER PUBLICATIONS

Murray et al., "One Module to Many Submissions: Generating Global Marketing Authorization Applications", Drug Information Journal, vol. 34, pp. 779-792, 2000.

* cited by examiner

TAGGING OF IMAGES BASED ON SOCIAL NETWORK TAGS OR COMMENTS

CROSS-REFERENCE TO RELATED APPLICATION

This non-provisional application claims priority to U.S. Provisional Application 61/922,597 filed on Dec. 31, 2013, the entire contents of which are incorporated herein by reference and is relied upon for claiming the benefit of priority.

FIELD OF THE INVENTION

The present invention relates in general to computers, and more specifically, to a system which allows users to tag, access, distribute, synchronize, manage and search different type of content, including but not limited to audio and video files across multiple devices and cloud servers.

DESCRIPTION OF THE RELATED ART

Many people today use multiple devices and media in their daily activities. Often these devices contain a great number of image files, such as digital photographs and videos. When such image files are created, i.e. when photographs are taken or videos recorded, recording devices usually create metadata associated with the image files. However, this metadata does not usually provide meaningful information regarding content of the image file. Typically, in order for a user to be able to easily manage these image files, the user must first perform tedious manual tagging operations, such as tagging names of his relatives and friends on faces and objects (e.g., sea, beach, house, tree, etc.) so that those faces and objects will be recognized and associated with the remainder of the user's photos and tagged in the future. In most cases, the user does not have time to perform this manual tagging.

As a result it becomes impossible for the user to perform a meaningful search of these files. Moreover, the user may have multiple copies of such image files located on the same device, or on his other devices, or in cloud storage. Managing these image files without meaningful tags becomes a challenge. There is a need for a system for automatically creating meaningful tags associated with the image files. Moreover it is sometimes preferred for such tags to be uniform across the user's devices, to be able to facilitate easy and reliable searching.

Often people post their pictures and videos on social networking sites. Some of such sites allow the person who posted such images and other social networking site users to tag these images or comment on them. These social network tags and comments usually provide information about people or events depicted in these images. We propose a system capable of utilizing these social network tags and comments to create meaningful tags for the user's image files.

SUMMARY

In general, one aspect of the subject matter described in this specification can be embodied in methods that include the actions of detecting one or more social network tag or social network comment associated with one or more social network images, wherein the one or more social network images are images posted by a user on a social networking site, and the one or more social network tags are tags associated by one or more social network users to the one or more social network images and the one or more social network comments are comments associated by one or more social network users to the one or more social network images; determining one or more textual tags based on the one or more social network tags or social network comments; and assigning the one or more textual tags to one or more image files, wherein the image files correspond to the one or more social network images. Other implementations of this aspect include corresponding systems, apparatus, and computer programs.

These and other aspects can optionally include one or more of the following features. The determining of the textual tag can include semantic analysis of the social network tag. The image file can be one of a plurality of image files associated with a user, and the methods can further include associating the textual tag with a second image file from the plurality of image files associated with the user based on analysis of properties of the image file and the second image file. The properties of the image file and the second image file can be selected from a set consisting file name, file location, file metadata, file creation date, file size, geographical location of a place where the image was captured, and file image analysis results.

These and other aspects can additionally include one or more of the following features. The determining of textual tag can further comprise selecting the textual tag from a tag library. The social network images can be digital photographs, pictures or videos. The social network comments can include second level social network comments.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

In order that the advantages of the invention will be readily understood, a more particular description of the invention briefly described above will be rendered by reference to specific examples that are illustrated in the appended drawings. Understanding that these drawings depict examples of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
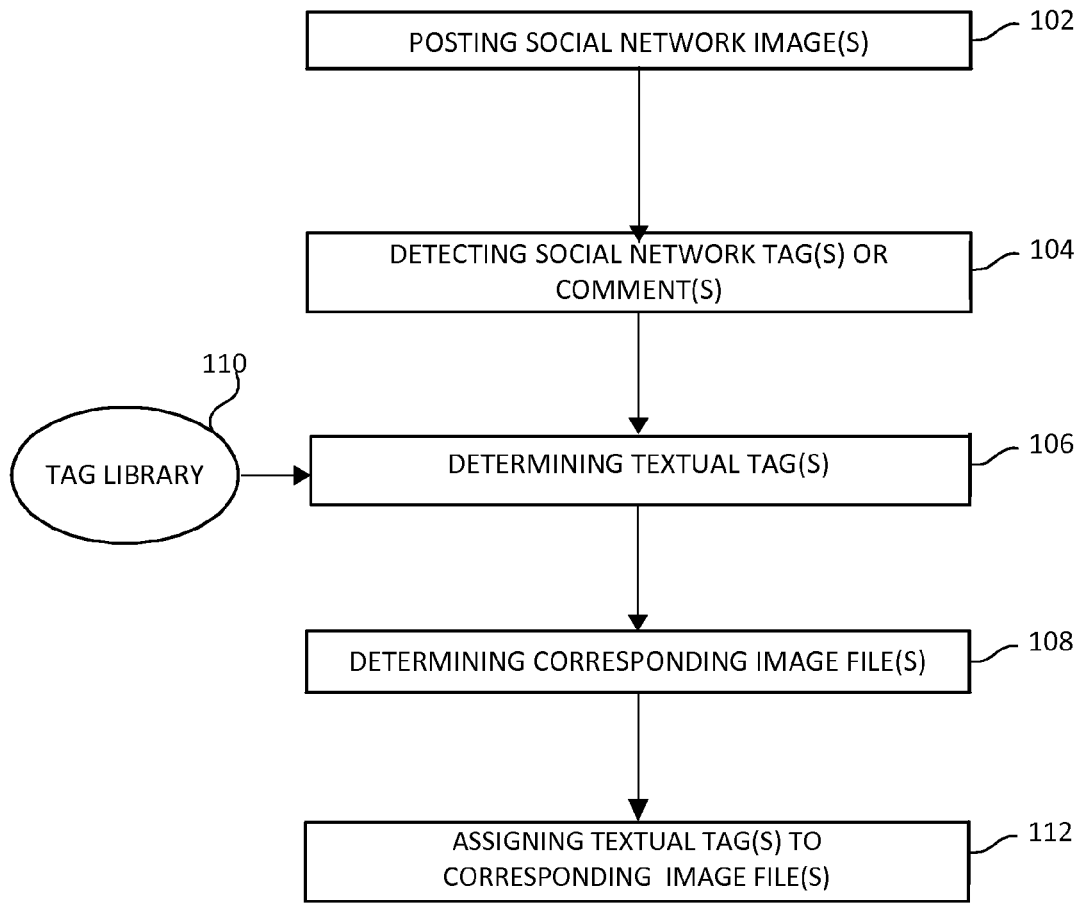
FIG. 1 is an example process for creating textual tags based on detected social network tags or comments.

FIG. 1 illustrates an example process for assigning tags to the image files. The image files are files containing digital images, such as digital photographs, digital videos, or digital pictures. The image files are composed of digital data in one of image file formats, such as JPEG, JFIF, TIFF, RAW, GIF, BMP, PNG, etc. In some examples the image files contain data in compressed format. In other examples these files are uncompressed.

In step 102 a social network image is posted on a social networking site. A social network image is an image, such as a photograph or a video, posted on a social networking site. A social networking site is an on-line service providing users an opportunity to participate in social interactions. Posting (uploading) an image on a social networking site includes sending a copy of a corresponding image file to a system supporting the site where this image will be consequently displayed.

In some implementations the social network image is a copy of an image file located on one or more of user's devices or other storage media associated with the user. In some implementations, when the user posts the image to the social networking site, the system creates an association between the social network image and a copy of this image on one or more of user's devices or other storage media. In some implementations, when the user posts the image to the social networking site, the system establishes a monitoring procedure for detecting whether a tag has been associated with this image through the social networking site.

In step 104 a social network tag or a social network comment associated with the social network image is detected. In some implementations the social network comment is a first-level comment. In other implementations the social network comment is a first-level comment of a second-level comment. In some implementations the social network comment is a comment of any level.

In some implementations the system keeps track of social network tags and comments associated with the social network images. In some examples, the system maintains a list of social network tags and comments associated with the social network image. In some implementations the system maintains separate lists for tags and for comments. In other implementations a combined list of tags and comments in used. When the social network tag or comment is detected, it is compared with the existing list (or lists) of tags and comments associated with this image. If the newly-detected social network tag or comment does not match any tags or comments on the list, the system proceeds to the next step of determining a textual tag based on this social network tag or comment 106. In some implementations, if the newly-detected tag or comment is already on the list, the system disregards this tag or comment.

In step 106 a text component of the social network tag or social network comment is analyzed to determine what textual tag should be created based on this social network tag or comment. A text component of a tag is a portion of the tag consisting of words in a natural language. A text component of a comment is a portion of the comment consisting of words in a natural language. In some implementations these text components are analyzed using semantic analysis to recognize their meaning. In some implementations text analysis software systems are used to perform this semantic analysis. In some implementation results of the semantic analysis are used in determining the textual tags. In other implementations the determination of the textual tags is performed without the semantic analysis.

In some implementations, the system uses its existing databases to analyze the social network tags and comments. For example, the system may contain a contacts database, which includes a detailed record of persons the user is in contact with, including multiple variations of these persons' names, such as full name, given name, various nicknames, etc. Such database may also include a unique tag to identify materials related to this person. If the social network tag or comment contains a nickname of a person depicted in the social network image, the system uses the contacts database to correctly identify the person in the image and to assign to this image the unique tag associated with this person. In some implementations the system uses the image or images tagged with this person's unique tag for face recognition of this person on other images which have not been posted on the social networking site.

In some implementations the determining of textual tags 106 consists of processing a text component of the social network tag or comment to decide which words from the text component should be used in the textual tags. In some implementations, the decision is based on syntactic analysis of the text component, or on the frequency analysis of words in the text component, or on comparing the words on the text component with an existing tag library 110, or a combination thereof.

In some implementations the tag library 110 is a collection of tags previously used by the user when tagging his image files. In other implementations the tag library is a collection of tags used on one or more of the user's devices and services. In still other implementations the tag library is a preexisting collection of tags obtained from an outside source.

In instances where the text component of a tag or comment has been processed using semantic analysis 106, the determining of textual tags 106 includes considering the results of the semantic analysis 106. For example, the results of the semantic analysis 106 of the text component include language-independent presentation of the text component. Therefore, when semantic analysis is applied, texts describing, for example, the same event or location using different vocabulary can still be matched to each other.

In step 108, image files corresponding to the social network image tagged with the social network tag or commented on are identified. An image file corresponds to the social network image if the image file contains an image substantially the same as the social network image. In some implementations, the system has information about the origin of the social network image, i.e. where the social network image was copied from. The system uses this information to identify image files corresponding to the social network image.

In some implementations the system does not have information regarding corresponding image files beforehand and performs a search of the user's devices and other storage locations associated with the user to identify image files corresponding to the social network images.

In some implementations steps 106 and 108 are performed simultaneously. In other implementations these steps are performed successively, where step 106 is performed before step 108 or step 108 is performed before step 106.

In some examples, after the textual tags are determined at step 106 and the corresponding image files are identified at step 108, one or more of these textual tags are assigned to the one or more of the image files 112. In some implementations the assigning of the one or more new textual tags is performed automatically. In other examples the new tags are first presented to the user, and the user is given an opportunity to accept or reject these new tags.

Figure 2:
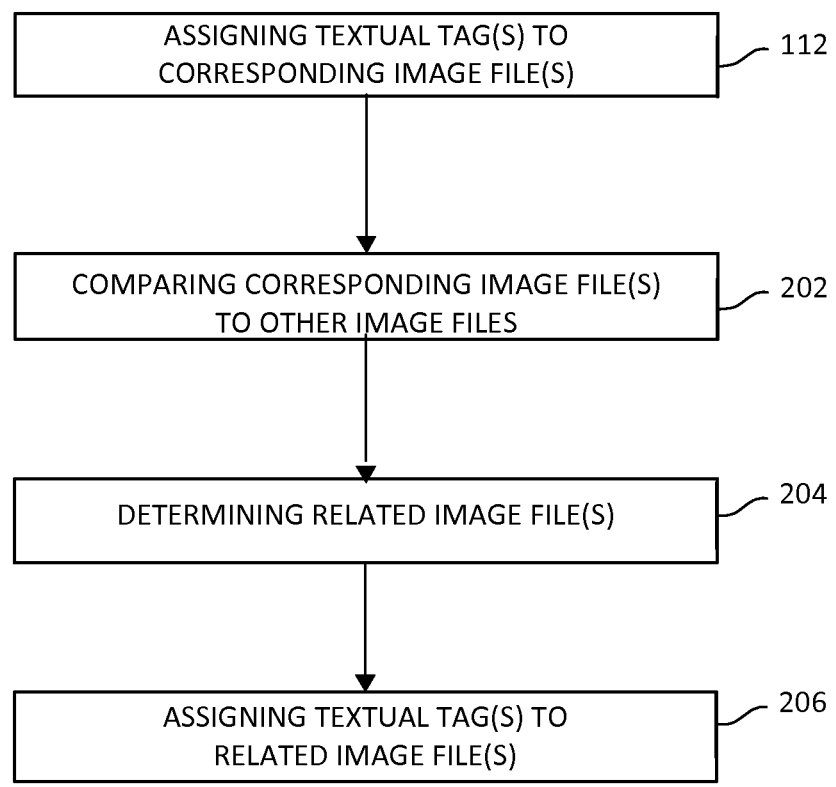
FIG. 2 is an example process for propagating the created textual tags to other image files associated with the same user.

As illustrated on FIG. 2, in some implementations, after one or more of the image files is assigned the new textual tag 112 based on the social network tags or comments, the system attempts to propagate these new tags to other images on the user's devices or other file storage locations.

In step 202, the other image files on the user's devices and other storage locations are compared to the newly tagged image file to identify related image files. In some examples, the file parameters being compared are one or more of the following: file name, file location, file metadata, file creation date, file size, geographical location of a place where the image was captured, file image analysis results, or any combination thereof.

In some implementations the step 202 includes performing file image analysis, sometimes including face recognition analysis and/or face detection analysis, of the newly tagged image file and the other image files. In some implementations the image analysis, face recognition analysis, and/or face detection analysis of the other image files is performed in advance, and the results of such analysis are used for comparison.

According to some implementations, one or more of the file parameters for the newly tagged image file and the other file are compared, and a distance between values of these parameters for the newly tagged image file and for the other image file is determined.

In step 204, the system determines which of the other files are related to the newly tagged image file to add the new tag to the related image files. In order to make this determination, one or more of the compared parameters are used. In some implementations, these parameters are combined based on the distances between the values of the parameters for the compared files. In some implementations, each parameter is weighed based on this distance. In still another implementation, the weight is either 0 or 1 where 1 is assigned when the parameters for the newly tagged file and the other file match, and 0 is assigned when they do not match. The weights are scaled and are determined based on the distance between values of these parameters, in some examples.

After the system determines which of the other image files are related to the newly tagged image file 204 and should have the new textual tag assigned to them, such assigning of the new textual tag 206 is performed automatically, in some implementations. In other implementations the user is first presented with the determined image file and the new textual tag and is given an opportunity to either confirm the new tag for this other image file or reject it.

Figure 3:
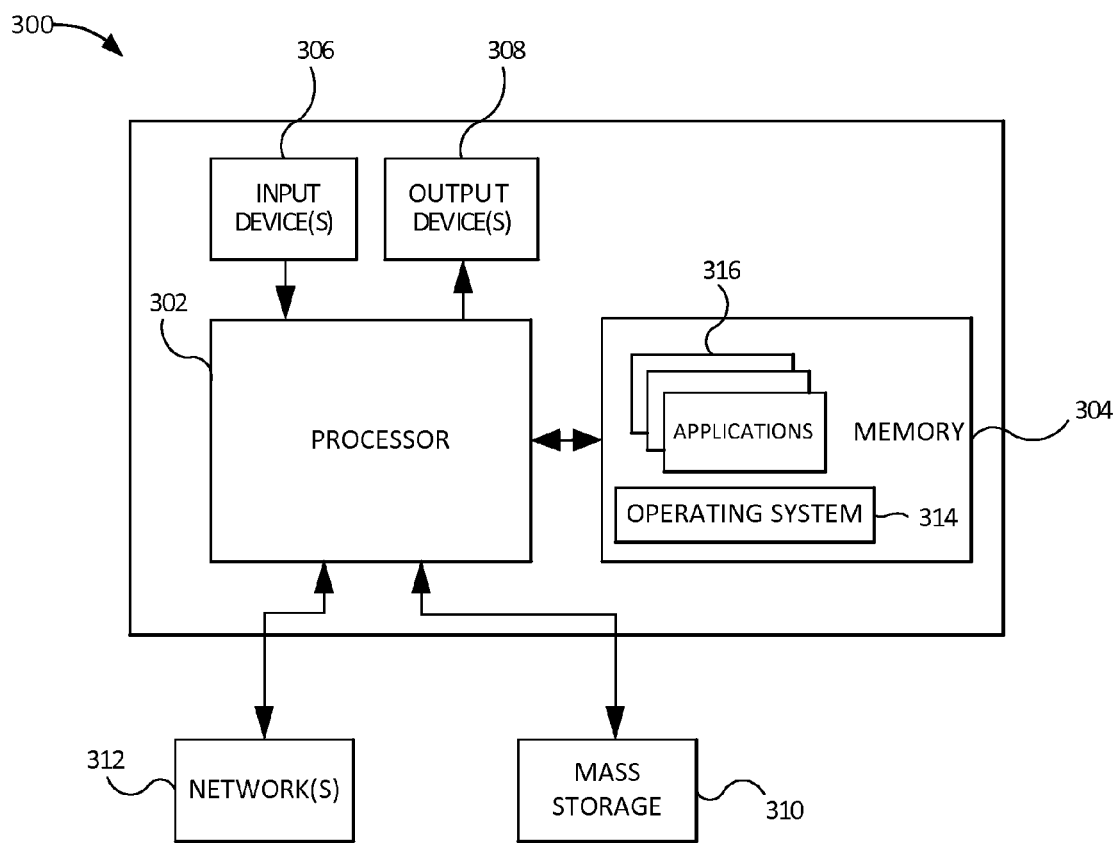
FIG. 3 illustrates an exemplary computer system that in some implementations is used with the present invention in which aspects of the present invention may be realized.

FIG. 3 illustrates an exemplary computer system 300 that in some implementations is used with the present invention, as described above. The system 300 includes one or more processors 302 connected to a memory 304. The processor(s) 302 may contain one or more computer cores or may be a chip or other device capable of performing computations (for example, a Laplace operator may be produced optically). The memory 304 may be random access memory (RAM) and may also contain any other types or kinds of memory, particularly non-volatile memory devices (such as flash drives) or permanent storage devices such as hard drives, etc. In addition, an arrangement can be considered in which the memory 304 includes remotely located information-storage media, as well as local memory such as cache memory in the processor(s) 302, used as virtual memory and stored on an external or internal permanent memory device 310.

The computer system 300 also usually includes input and output ports to transfer information out and receive information. For interaction with a user, the computer system 300 may contain one or more input devices 306 (such as a keyboard, a mouse, a scanner, or other) and output devices 308 (such as displays or special indicators). The computer system 300 may also have one or more permanent storage devices 310 such as an optical disk drive (CD, DVD, or other), a hard disk, or a tape drive. In addition, the computer system 300 may have an interface with one or more networks 312 that provide connection with other networks and computer equipment. In particular, this may be a local area network (LAN) or a Wi-Fi network, and may or may not be connected to the World Wide Web (Internet). It is understood that the computer system 300 may include analog and/or digital interfaces between the processor 302 and each of the components 304, 306, 308, 310 and 312.

The computer system 300 is managed by an operating system 314 and includes various applications, components, programs, objects, modules and other, designated by the consolidated number 316.

The programs used to accomplish the methods corresponding to this invention may be a part of an operating system or may be a specialized peripheral, component, program, dynamic library, module, script, or a combination thereof.

This description shows the basic inventive concept of the inventors, which cannot be limited by the hardware mentioned earlier. It should be noted that hardware is primarily intended to solve a narrow problem. As time goes by and as technology develops, such a task becomes more complex or it evolves. New tools arise that are capable of meeting new demands. In this sense, it is appropriate to look at this hardware from the point of view of the class of technical tasks they solve, not simply as a technical implementation on some elementary framework.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method comprising:
    detecting, by a data processing apparatus, an association of a plurality of social network tags with one or more social network images within a social network system, wherein the social network images were posted to the social network system by a first user of the social networking system, and wherein the association of the social network tags with the social network images is provided by one or more second users of the social network system;
    creating, by the data processing apparatus, one or more textual tags based on the social network tags comprising performing a semantic analysis on the social network tags to identify language-independent representations of the social network tags that provide for matching multiple different ones of the social network tags as a same one of the textual tags; and
    assigning, by the data processing apparatus, the textual tags to one or more first image files stored in one or more storage media associated with the first user other than the social network system, wherein the first image files correspond to the social network images.

2. The method of claim 1, wherein the first image files are from a plurality of image files stored in the storage media, and wherein the method further comprises:
    assigning the textual tags to a second image file from the plurality of image files based on a comparison of one or more properties of the first image files and the second image file.

3. The method of claim 2, wherein the properties of the first image files and the second image file comprise one or more of a file name, a file location, file metadata, a file creation date, a file size, a geographical location of a place where the first image files and the second image file were captured, or file image analysis results.

4. The method of claim 1, wherein the social network images comprise one or more of digital photographs or digital video files.

5. The method of claim 1, wherein the one or more second users comprise a plurality of users, and wherein the plurality of users comprises the first user.

6. The method of claim 1, wherein creating the textual tags comprises selecting the textual tags from a tag library.

7. A method comprising:
    detecting, by a data processing apparatus, an association of a plurality of social network comments with one or more social network images within a social network system, wherein the social network images were posted to the social network system by a first user of the social networking system, and wherein the association of the social network comments with the social network images is provided by one or more second users of the social network system;
    creating, by the data processing apparatus, one or more textual tags based on the social network comments comprising performance of a semantic analysis on the social network comments to identify language-independent representations of the social network comments that provide for matching multiple different ones of the social network comments as a same one of the textual tags; and
    assigning, by the data processing apparatus, the textual tags to one or more first image files stored in one or more storage media associated with the first user other than the social network system, wherein the first image files correspond to the social network images.

8. The method of claim 7, wherein the social network comments comprise second level social network comments.

9. A system comprising:
a machine-readable storage device having instructions stored thereon; and
a data processing apparatus in communication with the machine-readable storage device and operable to execute the instructions to:
detect an association of a plurality of social network tags with one or more social network images within a social network system, wherein the social network images were posted to the social network system by a first user of the social networking system, and wherein the association of the social network tags with the social network images is provided by one or more second users of the social network system;
create one or more textual tags based on the social network tags comprising performance of a semantic analysis on the social network tags to identify language-independent representations of the social network tags that provide for matching multiple different ones of the social network tags as a same one of the textual tags; and
assign the textual tags to one or more first image files stored in one or more storage media associated with the first user other than the social network system, wherein the first image files correspond to the social network images.

10. The system of claim 9, wherein the first image files are from a plurality of image files stored in the storage media, and wherein the data processing apparatus is further to:
assign the textual tags to a second image file from the plurality of image files based on a comparison of one or more properties of the first image files and the second image file.

11. The system of claim 10, wherein the properties of the first image files and the second image file comprise one or more of a file name, a file location, file metadata, a file creation date, a file size, a geographical location of a place where the first image files and the second image file were captured, or file image analysis results.

12. The system of claim 9, wherein the social network images comprise one or more of digital photographs or digital video files.

13. The system of claim 9, wherein the one or more second users comprise a plurality of users, and wherein the plurality of users comprises the first user.

14. The system of claim 9, wherein, to create the textual tags, the data processing apparatus is further to select the textual tags from a tag library.

15. A system comprising:
a machine-readable storage device having instructions stored thereon; and
a data processing apparatus in communication with the machine-readable storage device and operable to execute the instructions to:
detect an association of a plurality of social network comments with one or more social network images within a social network system, wherein the social network images were posted to the social network system by a first user of the social networking system, and wherein the association of the social network comments with the social network images is provided by one or more second users of the social network system;
create one or more textual tags based on the social network comments comprising performance of a semantic analysis on the social network comments to identify language-independent representations of the social network comments that provide for matching multiple different ones of the social network comments as a same one of the textual tags; and
assign the textual tags to one or more first image files stored in one or more storage media associated with the first user other than the social network system, wherein the first image files correspond to the social network images.

16. The system of claim 15, wherein the social network comments comprise second level social network comments.

17. A storage device having instructions stored thereon that, when executed by a data processing apparatus, cause the data processing apparatus to:
detect, by the data processing apparatus, an association of a plurality of social network tags with one or more social network images within a social network system, wherein the social network images were posted to the social network system by a first user of the social networking system, and wherein the association of the social network tags with the social network images is provided by one or more second users of the social network system;
create, by the data processing apparatus, one or more textual tags based on the social network tags comprising performance of a semantic analysis on the social network tags to identify language-independent representations of the social network tags that provide for matching multiple different ones of the social network tags as a same one of the textual tags; and
assign, by the data processing apparatus, the textual tags to one or more first image files stored in one or more storage media associated with the first user other than the social network system, wherein the first image files correspond to the social network images.

18. The storage device of claim 17, wherein the first image files are from a plurality of image files stored in the storage media, and wherein the instructions are further to cause the data processing apparatus to:
assign the textual tags to a second image file from the plurality of image files based on a comparison of one or more properties of the first image files and the second image file.

19. The storage device of claim 18, wherein the properties of the first image files and the second image file comprise one or more of a file name, a file location, file metadata, a file creation date, a file size, a geographical location of a place where the first image files and the second image file were captured, or file image analysis results.

20. The storage device of claim 17, wherein the social network images comprise one or more of digital photographs or digital video files.

21. The storage device of claim 17, wherein the one or more second users comprise a plurality of users, and wherein the plurality of users comprises the first user.

22. The storage device of claim 17, wherein, to create the textual tags, the instructions are further to cause the data processing apparatus to select the textual tags from a tag library.

23. A storage device having instructions stored thereon that, when executed by a data processing apparatus, cause the data processing apparatus to:
  detect, by the data processing apparatus, an association of a plurality of social network comments with one or more social network images within a social network system, wherein the social network images were posted to the social network system by a first user of the social networking system, and wherein the association of the social network comments with the social network images is provided by one or more second users of the social network system;
  create, by the data processing apparatus, one or more textual tags based on the social network comments comprising performance of a semantic analysis on the social network comments to identify language-independent representations of the social network comments that provide for matching multiple different ones of the social network comments as a same one of the textual tags; and
  assign, by the data processing apparatus, the textual tags to one or more first image files stored in one or more storage media associated with the first user other than the social network system, wherein the first image files correspond to the social network images.

24. The storage device of claim 23, wherein the social network comments comprise second level social network comments.

* * * * *